US006987793B2

(12) United States Patent
Dhar et al.

(10) Patent No.: US 6,987,793 B2
(45) Date of Patent: Jan. 17, 2006

(54) PREDICTIVE COLLISION AVOIDANCE IN MACRODIVERSE WIRELESS NETWORKS WITH FREQUENCY HOPPING USING SWITCHING

(76) Inventors: Naveen Dhar, 4891 Tuscany Cir., San Jose, CA (US) 95135; Lance Kazumi Uyehara, 1026 Del Cambre Dr., San Jose, CA (US) 95129; Ujjal Kumar Ghoshtagore, 4333 E. 2$^{nd}$ St., #408, Long Beach, CA (US) 90803; Gerhard Albert Koepf, 700 Kalmia Ave., Boulder, CO (US) 80304-1738; Jingqing Xiao, 877 Myrtle St., San Jose, CA (US) 95126

( * ) Notice: Subject to any disclaimer, the term of this patent is extended or adjusted under 35 U.S.C. 154(b) by 829 days.

(21) Appl. No.: 09/899,347

(22) Filed: Jul. 5, 2001

(65) Prior Publication Data

US 2002/0085622 A1 Jul. 4, 2002

Related U.S. Application Data

(63) Continuation-in-part of application No. 09/750,592, filed on Dec. 28, 2000.

(51) Int. Cl.
*H04B 1/69* (2006.01)
*H04B 1/707* (2006.01)
*H04B 1/713* (2006.01)

(52) U.S. Cl. .................... 375/132; 375/133; 375/130
(58) Field of Classification Search ................ 375/132, 375/133
See application file for complete search history.

(56) References Cited

U.S. PATENT DOCUMENTS 5,594,943 A * 1/1997 Balachandran .............. 455/436
6,034,988 A * 3/2000 VanderMey et al. ........ 375/134
6,240,073 B1 * 5/2001 Reichman et al. .......... 370/319
6,240,125 B1 * 5/2001 Andersson et al. ......... 375/132
6,249,540 B1 * 6/2001 Dicker et al. .............. 375/133
6,275,518 B1 * 8/2001 Takahashi et al. .......... 375/135
6,349,094 B1 * 2/2002 Vastano et al. ............. 370/328
6,490,262 B1 * 12/2002 Hogger ...................... 370/337
6,522,643 B1 * 2/2003 Jacomb-Hood et al. ..... 370/347
6,597,671 B1 * 7/2003 Ahmadi et al. ............. 370/329
6,799,044 B1 * 9/2004 Wesby et al. ............ 455/452.1
2002/0075941 A1 * 6/2002 Souissi et al. .............. 375/133
2002/0085622 A1 * 7/2002 Dhar et al. ................. 375/132
2002/0122461 A1 * 9/2002 Harvey et al. .............. 375/132
2002/0141479 A1 * 10/2002 Garcia-Luna-Aceves et al. .............. 375/132
2002/0191677 A1 * 12/2002 Chen et al. ................. 375/132
2003/0026353 A1 * 2/2003 Chen et al. ................. 375/316
2003/0045970 A1 * 3/2003 Maryanka ................... 700/293
2003/0067892 A1 * 4/2003 Beyer et al. ................ 370/328
2003/0086515 A1 * 5/2003 Trans et al. ................. 375/346
2004/0203806 A1 * 10/2004 Craig et al. ................. 455/450
2004/0246929 A1 * 12/2004 Beasley et al. ............. 370/335

* cited by examiner

*Primary Examiner*—Stephen Chin
*Assistant Examiner*—Erin File
(74) *Attorney, Agent, or Firm*—Berkeley Law & Technology Group, LLC

(57) ABSTRACT

A communication system using fast macrodiversity switching (FMS) and frequency hopping (FH) for wireless signals including downlink signals to and uplink signals from mobile stations. Frequency hopping sequences are determined for the uplink and downlink signals for the mobile stations. A plurality of transceiver stations employ broadcast channels and dedicated channels for communications with the mobile stations. A zone manager controls fast macrodiversity switching of dedicated channels among the mobile stations while broadcast channels remain unswitched. The zone manager extracts frequency hopping information to form predictions of dedicated channel collisions, and based upon the predictions, controls the dynamic switching of dedicated channels to avoid collisions.

22 Claims, 5 Drawing Sheets

FIG. 7

| | MAIO | Hopping Sequence Burst Frequencies | | | | | | |
|---|---|---|---|---|---|---|---|---|
| HS1 | 1 | 1 | 6 | 5 | 4 | 2 | 8 | 3 | 7 |
| | 2 | 6 | 5 | 4 | 2 | 8 | 3 | 7 | 1 |
| | 3 | 5 | 4 | 2 | 8 | 3 | 7 | 1 | 6 |
| | 4 | 4 | 2 | 8 | 3 | 7 | 1 | 6 | 5 |
| | 5 | 2 | 8 | 3 | 7 | 1 | 6 | 5 | 4 |
| | 6 | 8 | 3 | 7 | 1 | 6 | 5 | 4 | 2 |
| | 7 | 3 | 7 | 1 | 6 | 5 | 4 | 2 | 8 |
| | 8 | 7 | 1 | 6 | 5 | 4 | 2 | 8 | 3 |
| HS2 | 1 | 6 | 3 | 2 | 8 | 1 | 7 | 4 | 5 |
| | 2 | 3 | 2 | 8 | 1 | 7 | 4 | 5 | 6 |
| | 3 | 2 | 8 | 1 | 7 | 4 | 5 | 6 | 3 |
| | 4 | 8 | 1 | 7 | 4 | 5 | 6 | 3 | 2 |
| | 5 | 1 | 7 | 4 | 5 | 6 | 3 | 2 | 8 |
| | 6 | 7 | 4 | 5 | 6 | 3 | 2 | 8 | 1 |
| | 7 | 4 | 5 | 6 | 3 | 2 | 8 | 1 | 7 |
| | 8 | 5 | 6 | 3 | 2 | 8 | 1 | 7 | 4 |
| | | 1 | 2 | 3 | 4 | 5 | 6 | 7 | 8 |
| | | | | | Frame Number | | | | |

Time Slot Number 0
Time Slot Number 1
⋮
Time Slot Number 7

FIG. 8

| | Hopping Sequence Burst Frequencies | | | | | | | |
|---|---|---|---|---|---|---|---|---|
| MS₁ (MAIO1) | | | | | | | | |
| ₁BTS | 1 | 6 | 5 | 4 | 2 | 8 | 3 | 7 |
| FMS-₂BTS | | | | | | | | |
| MS₂ (MAIO3) | | | | | | | | |
| ₁BTS | 5 | 4 | 2 | 8 | 3 | 7 | 1 | 6 |
| FMS-₂BTS | | | | | | | | |
| MS₃ (MAIO6) | | | | | | | | |
| ₂BTS | 7 | 4 | 5 | 6 | 3 | 2 | 8 | 1 |
| FMS-₁BTS | 7 | 4 | 5 | 6 | 3 | 2 | 8 | 1 |
| FH/FMS-₁BTS | 7 | | | 6 | | 2 | 8 | 1 |
| FH/FMS-₂BTS | | 4 | 5 | | 3 | | | |
| MS₄ (MAIO3) | | | | | | | | |
| ₂BTS | 2 | 8 | 1 | 7 | 4 | 5 | 6 | 3 |
| FMS-₁BTS | 2 | 8 | 1 | 7 | 4 | 5 | 6 | 3 |
| FMS/FH-₂BTS | 2 | | | | | | | |
| FMS/FH-₁BTS | | 8 | 1 | 7 | 4 | 5 | 6 | 3 |
| | 1 | 2 | 3 | 4 | 5 | 6 | 7 | 8 |
| Time Slot Number 0 | | | | Frame Number | | | | |

Time Slot Number 1

•
•
•

Time Slot Number 7

PREDICTIVE COLLISION AVOIDANCE IN MACRODIVERSE WIRELESS NETWORKS WITH FREQUENCY HOPPING USING SWITCHING

CROSS-REFERENCE TO RELATED APPLICATIONS

This application is a continuation-in-part of the application entitled SYSTEM FOR FAST MACRODIVERSITY SWITCHING IN MOBILE WIRELESS NETWORKS, SC/Ser. No. 09/750,592 invented by Bhupal Kanaiyalal Dharia, Gopal Chillariga, Ujjal Kumar Ghoshtagore, Rohit Kaushal, Gerhard Albert Koepf and Lance Kazumi Uyehara, filed Dec. 28, 2000.

FAST MACRODIVERSITY SWITCHING WITH TIMING MANAGEMENT IN WIRELESS NETWORKS, SC/Ser. No. 09/879,603 invented by Gopal Chillariga, Bhupal Kanaiyalal Dharia, Gerhard Albert Koepf, Lance Kazumi Uyehara, filed Jun. 12, 2001.

BACKGROUND OF THE INVENTION

The present invention relates to the field of mobile wireless communication systems and more specifically to methods and apparatus for communication with mobile telephone users (cellular and personal communication systems), mobile wireless data communications, two-way paging and other mobile wireless systems.

In a mobile wireless network, mobile stations (MS) are typically in communications with one base transceiver station (BTS) through up and down radio links. Such ground-based radio links suffer from strong local variations in path loss mainly due to obstructions and line-of-sight attenuation. As MS move from one point to another, their signal path losses go through shadow fading fluctuations that are determined, among other things, by the physical dimension of the obstructions, antenna heights and MS velocity. These variations in path loss must be taken into account in the design of the uplink and downlink radio link resource allocation.

While communicating with a specific home BTS, MS are frequently within the communications range of other BTS. Statistically, due to the distribution of physical obstructions, the shadow fading path loss fluctuations to such other BTS tend to be only weakly correlated with the path loss fluctuations on the link between the MS and home BTS. Frequently, an MS, at any one time and location, has a lower path loss to a different BTS than the serving BTS with which it is communicating.

In high capacity wireless networks, efficient use of spectrum resources is of utmost importance. Dividing network layouts into ever smaller cells and tightening up frequency reuse, is one way to increase spectrum efficiency, but cannot be applied practically everywhere. Prior art studies on frequency reuse in wireless networks using time division multiplexing, such as GSM, show that frequency hopping (FH) can be used to randomize interference. Frequency hopping improves the carrier-to-noise/interference-ratio of radio links and decreases the frame erasure rate (FER). Thus, frequency hopping allows the loading factor in a network to be increased without increasing bandwidth. The benefits of FH become more pronounced as the pool of frequencies used in a region is increased.

For a set of n given frequencies, GSM allows 64×n different hopping sequences that are described by the MAIO (Mobile Allocation Index Offset) and the HSN (Hopping Sequence Number). The MAIO may have as many values as the number of frequencies in the set and the HSN may take 64 different values. Two channels bearing the same HSN but different MAIOs never use the same frequency on the same burst. Two channels using the same frequency list and the same time slot with different HSNs, interfere randomly for $1/n^{th}$ of the bursts. The sequences are pseudo-random, except for the special case of HSN=0, where the frequencies are used one after the other in order. Pseudo-random sequences have statistical properties similar to random sequences.

Usually, channels in one cell bear the same HSN and different MAIOs since it is desirable to avoid interference between channels in a cell. Since adjacent cells use disjointed frequency sets, they are not interfering. In distant cells using the same frequency set, different HSNs are used in order to gain from interferer diversity. In GSM, the Common Channels do not use frequency hopping. The common channels (FCCH, SCH, BCCH, P AGCH and RACH) use a fixed frequency.

In addition to frequency hopping, fast macrodiversity switching (FMS), as described in the above-identified cross-referenced applications, has been shown to improve carrier-to-noise/interference-ratio in networks where shadow fading, or slow fading, is present by adaptively switching radio channels to the path with the lowest path loss.

Networks suitable for using FMS or FH typically consist of multiple geographically distributed receivers ("collector resources") and transmitters ("broadcaster resources") and multiple mobile stations that communicate with collector resources on uplinks and with transmitter resources on downlinks. Frequently, collector and transmitter resources are co-located in base transceiver stations (BTS). Furthermore, multiple BTSs communicate with one or more base controller stations (BSCs) which in turn are connected via communications links with the Public Switched Telephone Network, with the Internet and/or with other facilities.

According to the above-identified cross-referenced applications, mobile users in FMS enabled networks may be communicating on uplink and downlink traffic channels with more than one BTS. In GSM, a traffic channel is defined as having a specific time slot and carrier frequency. Initially, an MS call is setup with one of the multiple BTSs. This BTS is called the home BTS ($_h$BTS) for the call. When during the course of the communications, the radio link path-loss between a particular mobile station, MS, and its $_h$BTS—due to a shadow fading event—becomes higher than the path loss between the particular MS and another BTS belonging to a set of assisting BTSs ($_a$BTS) for the particular MS, the traffic channel is switched from the $_h$BTS to an $_a$BTS. This $_a$BTS then becomes the serving BTS for the MS typically at least for the duration of the shadow fading event.

When an MS is served by an $_a$BTS during FMS operation, the $_a$BTS communicates with the MS on the same radio channel that was established for the $_h$BTS. Such communications may disturb the network frequency plan and may lead to an undesirable change in the interference environment. This change in the interference environment can occur in all FMS enabled networks, including those using FH, and tends to be independent of the frequency reuse plan.

FH has been found to be most beneficial in 1/3 and 1/1 frequency reuse plans. In both these reuse plans, all available traffic channels are used by every BTS in the network. In 1/3 frequency reuse plans, the pool of available frequencies is divided into three frequency sub-pools, and one such frequency sub-pool is assigned to each of the three sectors in every BTS. The one or more of radio resources in each sector share the frequency sub-pool assigned to the sector using FH for all time slots. Cyclical or random FH may be applied, both with the objective to avoid the simultaneous, or overlapping transmission of bursts within a sector using the same frequency. Such simultaneous, or overlapping transmissions of bursts (co-channel bursts) are called collisions (co-channel interference). Furthermore, the frequency hopping sequences in each sector are designed to minimize simultaneous or overlapping transmission of bursts in adjacent frequency channels (adjacent channel interference).

In 1/1 frequency reuse, the entire pool of available traffic radio channels is used by all radio resources in all sectors of all BTSs. To minimize collisions between traffic channels in different BTSs, each BTS is assigned one specific frequency hopping sequence (FHS). All radio resources within the three sectors of a BTS use the same FHS. To avoid collisions between the traffic channels within the BTSs, each radio resource is assigned one specific mobile allocation index off-set (MAIO). These MAIOs are chosen such that the hopping sequences of all radio resources are orthogonal, thereby avoiding collisions between traffic channels in the BTSs. The FHSs assigned to the plurality of BTSs are not orthogonal. Therefore collisions may occur between traffic channels used in different BTSs.

By way of one example, in a network with 1/1 frequency reuse, a mobile station, $MS_i$ communicating on a traffic channel, $TCH_1$, with abase transceiver station, $BTS_1$, using hopping sequence, $FHS_i$, and offset, $MAIO_i$, can have collisions with another mobile station, $MS_j$, communicating on traffic channel, $TCH_j$, with base transceiver station, $BTS_j$, using hopping sequence, $FHS_j$, and offset, $MAIO_j$. When such collisions happen, $MS_i$ and $MS_j$ receive simultaneous or overlapping downlink bursts from $BTS_i$ and $BTS_j$ at the same frequency. Likewise, $BTS_i$ and $BTS_j$ receive uplink bursts at the same frequency. Depending on the alignment of the downlink bursts in time, and depending also on the relative signal power levels at the $MS_i$ and $MS_j$ locations, the mobile stations may not be able to detect one or more bursts correctly. Similarly, the $BTS_i$ and $BTS_j$ may not be able to detect bursts correctly dependent on alignment and power levels of received bursts.

This problem is exacerbated when FMS and FH are is employed in the same environment. In the above example, when a BTS is a home $_hBTS_i$ for $MS_i$, $BTS_j$ is a home $_hBTS$ for $MS_j$, and when during a shadow fading event, $BTS_j$ becomes the assistant serving $_aBTS$ for $MS_1$, collisions occur between the traffic channel $TCH_j$, used for communications with $MS_j$ being served by $BTS_j$, and traffic channel $TCH_i$, used for communications with $MS_i$, also served by $BTS_j$.

While many different wireless networks have been proposed, there is a need for improved wireless networks that achieve the objectives of improved performance and higher density of Mss when both FH and FMS are employed.

SUMMARY

The present invention is a communication system using fast macrodiversity switching (FMS) and frequency hopping (FH) for wireless signals including downlink signals to and uplink signals from mobile stations. The system includes hopping control means determining frequency hopping sequences for the uplink and downlink signals for the mobile stations. A plurality of transceiver stations employ broadcast channels and dedicated channels for communications with the mobile stations. A zone manager controls fast macrodiversity switching of dedicated channels among the mobile stations while broadcast channels remain unswitched. The zone manager extracts frequency hopping information to form predictions of dedicated channel collisions, and based upon the predictions, controls the dynamic switching of dedicated channels to avoid collisions.

The fast macrodiversity switching dynamically switches radio links used for traffic and control channels for a mobile station among a number of base transceiver stations (BTS) without changing the radio resource, and uses the same frequency and time slot combination in a TDMA embodiment.

In order to avoid induced collisions that might be caused by fast macrodiversity switching, the system operates to predict bursts that might be involved in such collisions and temporarily switches one or more of those bursts to different BTSs thereby avoiding the collisions.

The channel switching is under control of zone managers. Each BTS includes or is otherwise associated with a zone manager where a home BTS has its zone manager (designated as a home zone manager) and assistant BTSs have their zone managers designated as assistant zone managers.

The control by the home and assistant zone managers includes switching downlink signals to and uplink signals from mobile stations among base transceiver stations which include broadcast channels (non-switched) and dedicated (switched) channels. Measurements of the wireless signals are made at macrodiverse locations. Zone managers process the measurements to determine preferred ones of the transceiver stations for particular dedicated channels for a particular mobile station. Preferred ones of the transceiver stations are dynamically selected to provide the dedicated channels for the mobile stations separately from the transceiver stations providing broadcast channels for the mobile stations. The measurements are made on the uplink signals from the mobile stations. The dedicated channels are switched as frequently as a signal change time which can be as frequent as the frequency of the measured signals, for example, the frame rate of the uplink signals. The change time is typically less than 1 second for mobile stations in a GSM system.

The foregoing and other objects, features and advantages of the invention will be apparent from the following detailed description in conjunction with the drawings.

BRIEF DESCRIPTION OF THE DRAWINGS

FIG. 7 depicts a representation of the data detected and stored in the database for use in FH and FMS operation.

FIG. 8 depicts a representation of the FMS and FH operation of mobiles using the data of FIG. 7.

DETAILED DESCRIPTION

Figure 1:
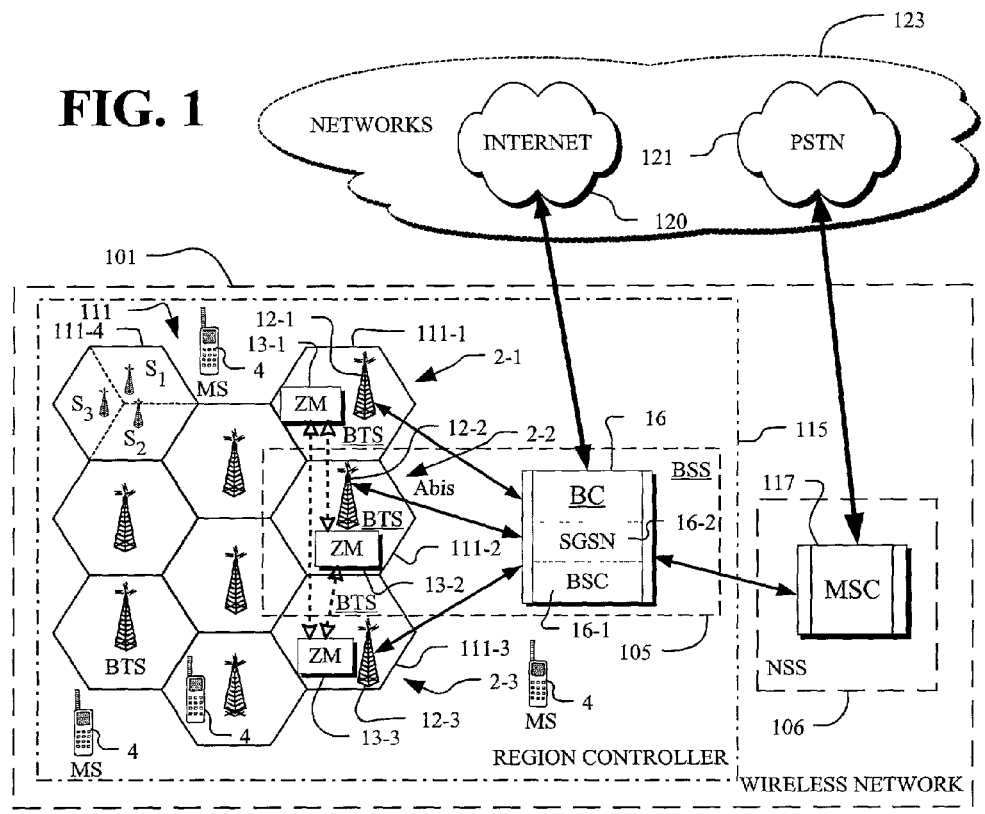
FIG. 1 depicts a wireless network formed of multiple base stations (BTSs) and multiple associated zone managers (ZMs).

FIG. 1 depicts a mobile wireless network 101 including base stations 12 that have radio downlinks and radio uplinks to abase controller 16. These links are typically cabled links such as T1/E1 lines. The base controller 16 is formed of a base station controller (BSC) 16-1 and a Serving GPRS Support Node (SGSN) 16-2. The BSC 16-1 controls the assignment of the radio link resources and the operation of the network and has an interface through the mobile switching center (MSC) 117, with the Public Switched Telephone Network (PSTN) 121 of networks 123. The SGSN 16-2 is primarily responsible for mobility management, detects mobile stations in the local area for the transmission and receipt of packets. Additionally, it locates and identifies the status of mobile stations and gathers crucial call information. The SGSN operates with standard network interfaces and capabilities for the transport of IP using Frame Relay and ATM over physical interfaces.

In FIG. 1, the base controller (BC) 16 including the base station controller (BSC) 16-1 and the SGSN 16-2 are part of the base station system (BSS) 105. The BSC 16-1 communicates with the base transceiver stations (BTS) 12 within the cells 111 of the wireless network 101. The cells 111-1, 111-2 and 111-3 are shown in expanded detail to include the BTS 12-1, 12-2 and 12-3, respectively, and the associated zone managers (ZM) 13 including ZMs 13-1, 13-2 and 13-3, respectively. The ZMs 13-1, 13-2 and 13-3 are interconnected to form a zone network that controls the macrodiversity switching of the channels among the BTSs 12. The zone network interconnecting the zone managers 13 can be in any form including mesh, daisy-chain, star or otherwise.

In FIG. 1, the MSs 4 are mobile within the cell region 111 and can move, for example, between the cells 111-1, 111-2 and 111-3. Furthermore, any one or more of the cells in cell region 111 maybe sectored as shown for example with cell 111-4 which is partitioned into three sectors, $S_1$, $S_2$ and $S_3$ where each sector operates with the same frequencies (for example, with 1/1 reuse) or different frequencies (for example, with 1/3 reuse) than the other sectors of the cell. As the MSs 4 move in the region 111, the ZMs 13 operate to implement the fast macrodiversity switching of the channels. In FIG. 1, the control functions of the BC 16, the BTS 12 and the ZM 13 collectively are part of a region controller 115, which controls the operation of the wireless network 101. In FIG. 1, the MSC 117, part of a network and switching subsystem (NSS) 106, connects to the PSTN 121 within the networks 123. Similarly, the SGSN 16-2 of the BC 16 connects directly to the Internet 120 of the networks 123.

In the wireless mobile network 111 of FIG. 1, when a connection to a BTS is setup for an MS, the BSC selects the BTS that has the best radio access to the MS. This setup process includes a series of signal transmissions back and forth between the BSC, the BTSs, and the MS using uplink and downlink radio control channels and results in the assignment of specific radio traffic channels for the uplink and downlink between the MS and the BTS. Once this connection is set-up, user traffic is transmitted between the MS and the BSC. While the connection lasts, the BTS/BSC controls the operation of the radio traffic channels, including power control, frequency hopping, and timing advance while it continues to use the radio control channels for operation, maintenance and signaling with all the other MSs in the cell.

In the wireless mobile network 111 of FIG. 1, broadcast channels and non-broadcast channels are separate. Non-broadcast channels include dedicated control and traffic channels specific to an MS. Broadcast channels are used for signaling and control messages shared by all MSs within the cell, including MSs that are not in use for carrying traffic. Broadcast and non-broadcast channels are carried over radio control links. Traffic channels are used to transport user signals, also called payload, which can be voice or data. Dedicated control and traffic channels are transported over radio links, set-up individually between a MS and a BTS. To ensure that all MSs within the cell have access to the control signals, the radio link for the broadcast channel is designed to be very reliable by using robust coding and modulation techniques and a high transmit power level.

In the wireless network 111 of FIG. 1, non-broadcast channels serve individual MSs and are at times operated at lower power levels. For instance, MSs close to a BTS do not require large transmit power levels and are operated at the minimum level meeting the link quality requirements. The reason for reducing power is to conserve radio band resources to enable reuse of radio resources in as many cells in the network as possible. MSs sharing uplink radio resources generate co-channel interference at their respective BTSs and BTSs sharing downlink radio resources generate co-channel interference at their respective MSs.

Shadow fading imposes large fluctuations on the path loss between a particular MS moving in a cell and its serving BTS. At times when the path loss to the BTS is high, a high transmit power is used to maintain the quality of service. At such times, it is likely that the path loss between the particular MS and another BTS is lower because shadow fading effects between a MS and different BTSs are not highly correlated. Therefore, such other BTS can communicate traffic and/or control signals with the particular MS using lower uplink and downlink power levels. By switching the traffic and/or control channel over to such other BTS, the contribution of the particular radio link to the interference level in the network for other MS BTS links that use the same radio resources is reduced. When such traffic switching is implemented for many radio links in a network, a larger number of links can be operated in the network increasing network capacity without adding radio bandwidth.

To take advantage of the de-correlation of shadow fading effects, a BTS with the lowest instantaneous path loss for communicating dedicated uplink and downlink channels to a particular MS is selected using fast macrodiversity switching (FMS). In order to implement the operation, home and assistant BTSs are employed in some embodiments. The home BTS is the BTS that is selected by the BSC 16-1 during connection set-up or handover for communications with a particular MS 4. The home BTS remains in control of the particular MS 4 via its control channel until a handover is carried out. While maintaining the home BTS for control, the dedicated channels with the particular MS are routed originally through the home BTS. When another BTS with a lower path loss becomes available, the traffic channel is routed through such other BTS, which is designated as the assistant BTS for that particular traffic channel. As an MS moves through the cell, and as its path and shadow-fading losses change, the traffic channel is switched among a number of BTSs in the network, including the home BTS. This traffic channel switching continues until the path loss between the particular MS and the home BTS for the broadcast control channel becomes too high and a handover is executed.

In the fast macrodiversity switching (FMS) process described, the radio resource used for a dedicated channel (frequency, time slot, code) for the home BTS is not changed. FMS is therefore different from the handover process where both, the control and traffic channels are switched from radio resources assigned to the old BTS to radio resources assigned to the new BTS in accordance with a frequency reuse plan.

In FMS operation of FIG. 1, it is assumed for purposes of explanation that BTS 12-1 and ZM 13-1 form the home base station (BS) 2-1 for some particular MS. It is also assumed that BS 2-2 and BS 2-3 are assistant BSs available to transmit and receive channels on a radio resource assigned to the home BS 2-1. Since every BS in the network can be both a home BS for some MSs and an assistant BS for other MSs, each such BS has collector and broadcaster resources that can be commanded to tune to any frequency available in the network. In one embodiment, additional broadcaster and collector resources are installed in BTSs over what are originally used in the BTSs. These additional resources can be solely dedicated to perform the assistant BS fast macrodiversity switching functions under the control of a zone manager (ZM) 13. In one embodiment, the use of the original radio resources in the BTS is controlled by the BSC. In another embodiment, the original broadcasters and collectors of a BTS and any additionally installed broadcasters and collectors form a common radio resource pool. In this common pool implementation, all radio resources in the pool may be used to perform the home and the assistant BTS functions. This common pooling implementation makes better use of the available radio resources. Control of this resource pool may be with the BSC 16-1 for the home BTS function and with the ZMs for the assistant BTS functions, or control of all resources maybe with either the BSC 16-1 or the ZMs 13.

Figure 2:
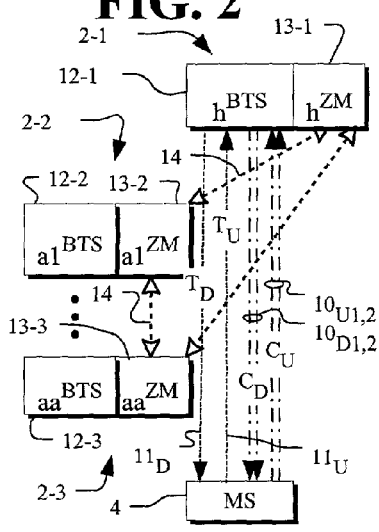
FIG. 2 depicts part of a wireless network formed of multiple base stations (BTSs) and multiple zone managers (ZMs) where traffic and control communications are between a home BTS and an MS under control of a home zone manager and assistant zone managers for other BTS.

In FIG. 2, the home BTS ($_h$BTS) 12-1 and the corresponding home ZM ($_h$ZM) 13-1 form the home base station ($_h$BS) 2-1 for the particular one MS 4 shown in FIG. 2. The home $_h$BTS 12-1 and the MS 4 in the instance of FIG. 2 operate essentially as a standard GSM system. Communications between the $_h$BTS 12-1 and the MS 4 include the uplink traffic, TU, on link 11U and downlink traffic, TD, on link 11D. The control channels include the downlink control, CD, on link 10D, and the uplink control, CU, on link 10U. Although MS 4 is under control of the home $_h$BTS 12-1, assistant BTSs, including a first assistant $_{a1}$BTS 12-2 and a second assistant $_{aa}$BTS 12-3, associated with the assistant zone managers $_{a1}$ZM 13-2 and $_{aa}$ZM 13-3, respectively, also are available for communications with MS 4. The $_h$ZM zone manager 13-1, $_{a1}$ZM zone manager 13-2 and $_{aa}$ZM zone manager 13-3 are interconnected via link 14 to form the microdiversity switching network for controlling the fast switching of the dedicated channels among the $_h$BTS 12-1, $_{a1}$BTS 12-2 and $_{aa}$BTS 12-3. Any number of BTSs 12 and ZMs 13 can be included in the channel switching network of FIG. 2.

Figure 3:
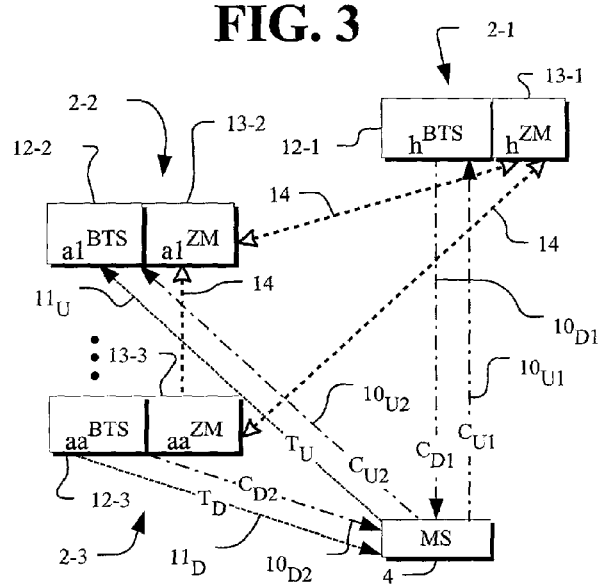
FIG. 3 depicts part of a wireless network formed of multiple base stations (BTSs) and multiple zone managers (ZMs) where control communications are between a home BTS and an MS while traffic communications are between assistant BTSs, all under control of a home zone manager and assistant zone managers.

In FIG. 3, the $_h$BTS 12-1 and the corresponding $_h$ZM 13-1 are the home BTS and the home ZM forming the home BS 2-1 for the MS 4. The relationship between the BTS 12-1 and the MS 4 of FIG. 3, however, is not like that for a standard GSM system. In FIG. 3, the dedicated traffic and control communication have been switched to be between the assistant $_{a1}$BTS 12-2 in the assistant BS 2-2 and the MS 4 for the uplink traffic, TU, on link 11U, uplink dedicated control channel $C_{U2}$ on link $10_{U2}$ and has been switched to assistant $_{aa}$BTS 12-3 in the assistant BS 2-2 for the downlink traffic, TD, on link 11D and downlink dedicated control channel $C_{D2}$ on link $10_{D2}$. The broadcast control channels, including the downlink control, $C_{D1}$ on link $10_{D1}$ and the uplink control, $C_{U1}$, on link $10_{U1}$, remain between home $_h$BTS 12-1 and MS 4. Although MS 4 is under control of the home $_h$BTS 12-1, the assistant BTSs including $_{a1}$BTS 12-2 and $_{aa}$BTS 12-3, associated with the assistant zone managers $_{a1}$ZM 13-2 and $_{aa}$ZM 13-3, participate directly for the traffic with MS 4.

In another embodiment, both dedicated channels can be switched to the same assistant BTS, such as BTS 12-1. In yet another embodiment traffic channels TU and TD are switched to one assistant BTS and both dedicated control channels are switched to another assistant BTS, including not being switched to an assistant BTS at all.

Figure 4:
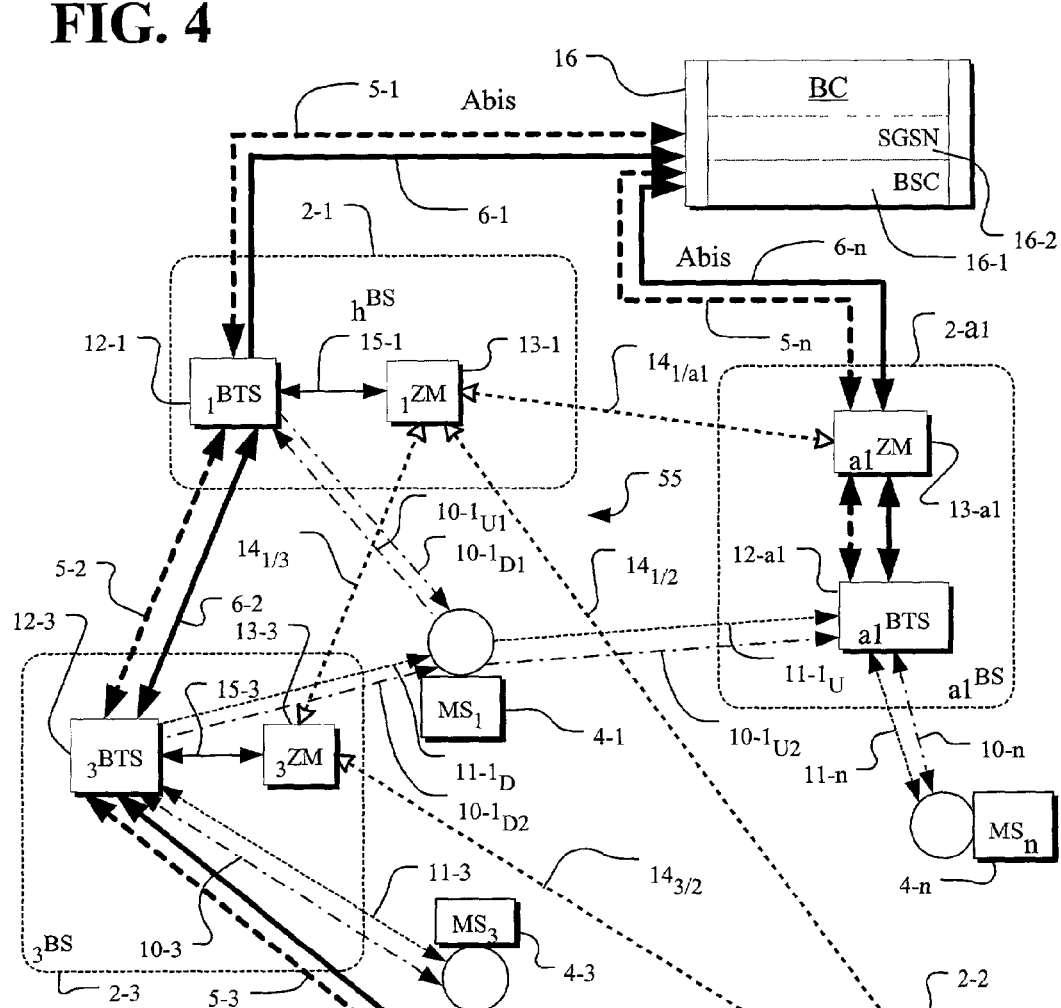
FIG. 4 depicts further details of the home/assistant wireless networks of FIG. 1 through FIG. 3 with home and assistant zone managers.

In FIG. 4, there are n users, MS 4, namely $MS_1$ 4-1, $MS_2$ 4-2, $MS_3$ 4-3, ..., $MS_n$ 4-n. User $MS_1$ is shown communicating with $_h$BTS 12-1 in the home $_h$BS 2-1 via control link 10-1 shown as uplink 10-U1 and downlink 10-1D1. The user $MS_1$, is communicating with a control and traffic uplink 10-1U2 and 11-1U to assistant $_{a1}$BTS 12-a1 in base station 2-a1 and with a control and traffic downlink 10-1D2 and 11-1D to assistant $_3$BTS 12-3 in base station $_3$BS 2-3. The $_1$BTS 12-1 is the home BTS for $MS_1$. Similarly, user $MS_2$ communicates with $_2$BTS in $_2$BS 2-2 via control and traffic links 10-2 and 11-2, respectively. The $_2$BTS 12-2 is the home BTS for $MS_2$. User $MS_3$ 4-3 communicates with $_3$BTS 12-3 in $_3$BS 2-3 via control and traffic links 10-3 and 11-3, respectively. The $_3$BTS 12-3 is the home BTS for $MS_3$ and the $_{a1}$BTS and $_3$BTS are assistant BTS for user $MS_1$. Likewise, user MSn 4-n communicates with a1BTS in a1BS 2-a1 via control and traffic links 10-n and 11-n, respectively. The $_{a1}$BTS 12-a1 is the home BTS for MSn 4-n.

The $_3$BTS 12-3 is the home BTS for $MS_3$ and the $_{a1}$BTS and $_3$BTS are assistant BTS for user $MS_1$.

In FIG. 4, the BSC 16-1 in the base controller (BC) 16 communicates over an Abis interface, including the uplink and downlink control signals 5-1, 5-2, and 5-3 and the uplink and downlink traffic signals 6-1, 6-2, 6-3, with the 1BTS 12-1 in base station 2-1, the 3BTS 12-3 in base station 2-3, and with the 2BTS 12-2 in base station 2-2. Similarly, the BSC 16-1 communicates over an Abis interface, including the uplink and downlink control signals 5-n and the uplink and downlink traffic signals 6-n connected to the $_{a1}$ZM zone manager 13-a1 in the a1BS base station 2-a1.

In FIG. 4, the user $MS_1$ 4-1 communicates with its home 1BTS 12-1, which is part of the home base station ($_h$BS) 2-1. Also included in the home base station 2-1 is the zone manager $_1$ZM 13-1, which serves as the home zone manager for the user $MS_1$.

In FIG. 4, the base station $_{a1}$BS base station 2-a1 is an assistant for user $MS_1$ and includes the $_{a1}$ZM zone manager 13-a1 and the assistant $_{a1}$BTS 12-a1. The base station 2-a1 is the home base station for the user MSn and is an assistant base station for the base station 2-1 that is the home base station for the user $MS_1$ 4-1. In the a1BS base station 2-a1, the zone manager 13-a1 is positioned in the Abis interface connection between the BSC 16-1 and the $_{a1}$BTS.

The zone manager means (ZMs) 13 control the FMS process. In the FIG. 5 implementation, one discrete zone manager is installed in each cell and is associated with a corresponding BTS 12 for that cell. Collectively, the discrete zone managers 13-1, 13-2, 13-3 and 13-a1 form the zone manager means 13.

Figure 5:
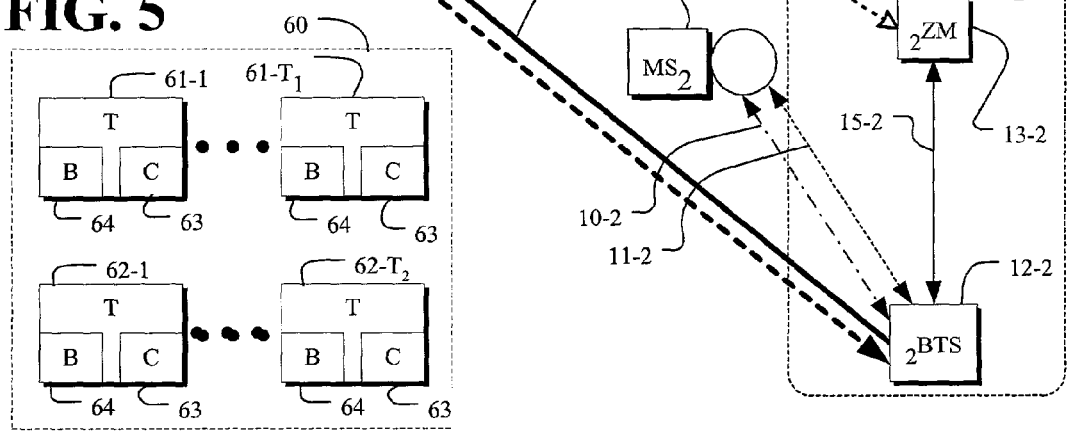
FIG. 5 depicts a representation of the transceivers, which form a part of each of the base stations of FIG. 4.

In FIG. 4 the zone managers $_1$ZM, $_2$ZM, $_3$ZM, ..., $_{a1}$ZM form the zone manager network 55 for controlling the FMS of the dedicated channels. In the embodiment of FIG. 5, zone manager $_1$ZM connects to zone manager $_3$ZM via the link 141/3, the zone manager $_1$ZM connects to the zone manager $_2$ZM via the link 141/2, the zone manager $_3$ZM connects to the zone manager $_2$ZM via the link 143/2 and the zone manager $_1$ZM connects to the zone manager $_{a1}$ZM Via the link 141/$_{a1}$. In some embodiments, the zone manager is separate from the BTS as shown in the base station 2-1 of FIG. 4 with an interface at 15-1 between the $_1$BTS and the $_1$ZM, an interface 15-2 between the $_2$BTS and the $_2$ZM, and/or an interface 15-3 between the $_3$BTS and the $_3$ZM. In other embodiments, the ZM is in the Abis interface connection as shown in the $_{a1}$BS base station 2-$a$1. In still other embodiments, the ZM is fully integrated with the BTS. The particular implementation selected for the ZM is a matter of design choice.

In FIG. 4, broadcasters and collectors are included as a common entity in each BTS 12. In some wireless networks broadcasters and collectors for the same BTS are separated by macro-diverse distances and are therefore considered separately. The usual configuration where the uplink and downlink path losses typically are highly correlated has broadcasters and collectors co-located at the BTS.

FIG. 4 represents a snap shot of a FMS implementation for one particular period of time analogous to the configuration of FIG. 3. Any of the MS, for example MS$_2$ or MS$_3$ can also communicate with different BTS on their control and traffic channels at any time in the manner suggested in FIG. 2 and FIG. 3. The FIG. 4 embodiment has distributed discrete zone managers. In another embodiment, the zone manager function can be centralized and located, for example, in the BSC 16-1. As shown in FIG. 4, the zone manager maybe integrated or connected with the BTS, or located on the Abis link.

FIG. 5 depicts a representation of the transceivers 60, which form a part of each of the base stations 2 of FIG. 5. In FIG. 5, the transceivers 61 and 62 each include a co-located broadcaster resources (B) 64 and collector resources (C) 63. The transceivers 61-1, ..., 61-T$_1$ are the home radio resources that are present in an original GSM installation (without FMS). The transceivers 62-1, ..., 62-T$_2$ are the guest radio resources that are added in connection with FMS. The transceivers 61 and 62 of FIG. 5 can be considered as a single pool allocated for any function in a base station 2 or can remain segregated so that the transceivers 61-1, ..., 6l-T$_1$ are allocated for ordinary base station operation and the transceiver 62-1, ..., 62-T$_2$ are allocated by zone managers only for FMS functions.

Figure 6:
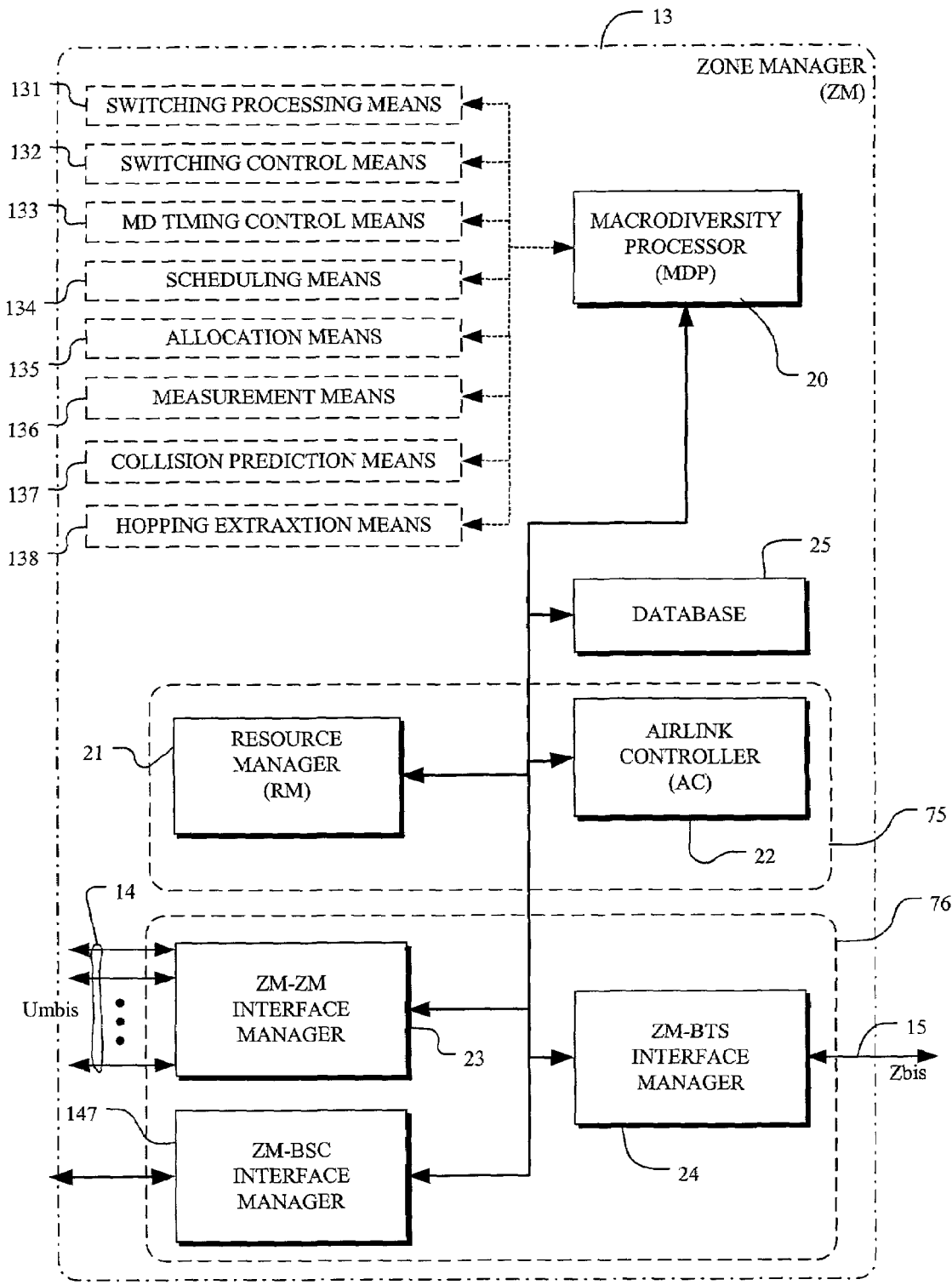
FIG. 6 depicts a schematic block diagram of a zone manager.

In FIG. 6, the basic components of a zone manager 13 are shown. The function of each ZM 13 is to enable fast macrodiversity switching in the mobile wireless network. The basic components of a zone manager 13 include a macrodiversity processor (MDP) 20, control means 75 including resource manager (RM) 21 and airlink controller (AC) 22, and interface means 76 including ZM-ZM interface manager 23 for the ZM-to-ZM links 14 (Umbis interface), ZM-BTS interface manager 24 for the BTS-to-ZM transceiver link 15 (Zbis interface) and ZM-BSC interface manager 147. The control means 75 issues broadcaster commands for controlling the downlink signals to each of selected ones of mobile stations and collector commands for controlling the plurality of macro-diverse collectors for changing the uplink signals for each of other selected ones of the mobile stations. Similar to the roles of home and assistant BTS, a distinction is made between home ZM and assistant ZM. A home ZM controls the fast macrodiversity switching services to the set of MS within the cell of the home BTS. An assistant ZM 13 provides fast macrodiversity switching services to the home ZM 13 for the same set of MS. Therefore, the role of a particular ZM 13 depends on the location of MS in the network. Any ZM 13 is a home ZM for the particular MS controlled by the home BTS and an assistant ZM for all other MSs.

In FIG. 6, the macrodiversity processor (MDP) 20 is a processor for processing the measurement, control and other signals used in controlling the fast macrodiversity switching and frequency hopping. The resource manager (RM) 21 functions to keep track of and control all of the resources, including BTS broadcasters and collectors, available used and unused channels and links, and other resources in the wireless network needed for fast macrodiversity switching.

The airlink controller (AC) 22 is responsible for controlling the radio links among the BTSs and MSs via assistant ZMs and ZM-ZM links 14. The ZM-ZM interface manager 23 controls the ZM-to-ZM (Umbis) interface links 14 among zone managers 13 and supervises the zone manager network 55 of FIG. 4 for controlling the fast macrodiversity switching of dedicated channels. The ZM-BTS interface manager 24 functions to control the ZM-BTS link (Zbis) 15 between the ZM and BTS of a base station (BS). The ZM-BSC interface manager 147 is for interfacing the zone manager 13 of FIG. 6 to the BSC 16-1 of FIG. 1.

The resource manager (RM) 21 within the ZM 13 controls the radio resources for fast macrodiversity switching services. In a typical BTS, a number of transceivers (see 61-1, ..., 61-T $_1$ in FIG. 5) are installed to provide the radio links to an MS. In a BS 2 of FIG. 4, additional transceivers, called guest transceivers (see 61-1, ..., 61-T$_2$ in FIG. 5) are installed. These guest transceivers provide the additional radio resources useful in implementing fast macrodiversity switching. In the basic implementation, as discussed above, radio resources provided by the guest transceivers are managed by the RM 21, while the allocation of the home transceiver radio resources remains under BSC 16 control. The RM 21 keeps track of all used and idle home and guest radio resources available in its home BS including the transceivers of FIG. 5. It receives radio link information, for example in the form of measurement reports and other information, either directly from its corresponding ZM or from other ZM in assistant BSs via the ZM-to-ZM links 14. Since the transceiver stations communicate over a region containing one or more zones and the measurements are received from one or more collectors in the transceiver stations, the measurements from collectors include radio link conditions between a mobile station and the one or more collectors where the radio link information incorporates radio link conditions such as path loss, forward error rates, and carrier-to-interference ratio. The RM 21 in the home ZM also tracks radio resource usage in all assistant BSs through communications with the RMs in the assisting BSs. The RM 21 in the home BS stores and updates this information in a radio resource data base (DB) 25. During installation, all RMs are initialized with the identity of those BTSs in the network that are candidates for becoming assistant BTSs and the specific radio resources available in these BTSs. Alternatively, the ZM's may communicate with each other to determine the identity of assistant BTSs both at setup time and periodically during operation. When the MDP 20 requests a radio resource, the RM 21 checks the priority level of the request and the availability (in location, frequency, time slot or spreading code) of a radio resource suited to meet the request as stored in DB 25. If no such resource is available, or if the priority level of the request is insufficient, the request is denied. Otherwise, the radio resource is released and the data base 25 is updated accordingly. The assignment of the radio resource is also communicated to the other RMs in other ZMs for updating their respective data bases.

To perform the fast macrodiversity switching function, the ZM uses algorithms to track information in real time and to provide resource contention resolution, for the home BS as well as for all assistant BS, for each MS. The ZM controls the outgoing information flow on the links 14 to other ZMs including the bandwidth resources of the links 14 between home BS and assistant BSs. The process of controlling the resources of the links 14 is analogous to the process of controlling the radio resources.

In one implementation, the home and guest transceivers form a pool of radio resources for assignment by both the ZM and the BSC, or by the ZM alone. In the latter case, the ZM is responsible for tracking and assigning radio resources for the home cell, both for normal traffic and for the fast macrodiversity switching service.

The MDP 20 provides several functions. One function of MDP 20 is to extract radio link quality measurements over the ZM-to-BTS data link for all the MSs in the home cell. These measurements are processed to determine when a need for fast macrodiversity switching services exists and what priority level is appropriate. Another function of the MDP 20 is to determine which of the assistant BTSs is best suited to provide the service. This function is done by transfer of measurements from the MDP 20 in one ZM 13 to other MDPs in the other ZMs. The MDP 20 then sends requests with a priority level for an appropriate radio resource and for link bandwidth to the RM 21. If the resource is available, the downlink traffic data is sent to the ZM-BTS interface manager 24 for transmission to the assistant BTS. Similarly, the AC 22 is instructed to make the radio resource available with configuration for fast macrodiversity switching. Similarly, on the uplink, the assistant BTS is instructed to receive uplink traffic from the MS on the identified radio link and to forward the traffic to the home BTS.

Another function of the MDP 20 is to monitor the control channels relayed by the home BTS. In the event of a MS or BSC originated handover, the MDP 20 may intervene with the handover process and continue fast macrodiversity switching services, or discontinue fast macrodiversity switching services with the MS 20 controlling the handover.

A further function of the MDP 20 is the control of the fast macrodiversity switching speed. Depending on the shadow fading statistics, as determined by the radio link measurements, the MDP 20 uses internal speed algorithms to optimize the fast macrodiversity switching speed.

Another function of the MDP 20, in some embodiments, is to provide aggregation services. These aggregation services are similar to fast macrodiversity switching functions and are performed using the ZMs. In aggregation, more than one transceiver is communicating with a particular MS. On the downlink, this operation consists of transmitting signals from more than one broadcaster to the particular MS using the same radio resource. This service is only possible with MSs that have the ability to receive the signals received separately and process the received signals to obtain a resulting downlink signal with a higher confidence level than any of the individual downlink signals. On the uplink, aggregation consists of receiving the particular MS signal in the collector of the home BTS, together with the MS signal with collectors located at assistant BTSs, transmitting these uplink signals to the MDP 20 in the home BTS via the ZM-to-ZM data links 14, and processing these signals to form a resulting uplink signal with a higher confidence level than any of the individual uplink signals.

The airlink controller (AC) 22 provides the ZM 13 with the ability to set certain parameters of the uplink and downlink radio links between a guest transceiver and a MS using macrodiversity services. By way of example, the AC 22 has the ability to determine and set transmit power settings. When a guest transceiver is assisting another BS to provide a radio link to a MS, the AC 22 informs the transceiver providing the radio resource for the fast macrodiversity switching service of the initial power level. Similarly, the AC is responsible for timing advance and for synchronizing the data transfer on the uplink and downlink during fast macrodiversity switching operations.

The ZM-to-ZM links 14 of FIG. 6 are used in fast macrodiversity switching. Referring to FIG. 1, a hierarchical control structure routes traffic between the PSTN 121 via a mobile switching center (MSC) 117 to an MS 4 through one of a number of BSCs (like BSC 16 in FIG. 1) and then through one of an even larger number of BTSs 12. With fast macrodiversity switching, however, uplink and downlink traffic is also routed between BTSs 12 through operation of the zone managers 13. In addition to routing traffic for fast macrodiversity switching services, the ZM-to-ZM links 14 are used in the control of the fast macrodiversity switching process. This fast macrodiversity switching control function is distributed among the ZMs. The data exchange between ZMs for providing each other with the measurement, resource and other information needed for fast macrodiversity switching services, is carried over the ZM-to-ZM links 14. The control of this information flow is managed by the RM 25 in each of the ZMs, but the formatting, organization of the data and the actual transmission is controlled by ZM-ZM interface mangers 23 in a zone manager at each end of a ZM-to-ZM link 14.

In FIG. 6, the ZM-ZM interface manager 23 provides latency control and bandwidth management across the ZM-to-ZM links 14. The ZM-ZM interface manager 23 also contributes to fast macrodiversity switching decision by monitoring the link utilization and quality of service over the ZM-to-ZM links 14.

The ZM-to-BTS link (Zbis) 15 is used to transport voice or data traffic, connection set-up information, control information (for MDP, RM, and AC functions) and fast macrodiversity switching traffic forwarded to other ZMs and BTSs. The control of this data flow in both directions is formatted and organized by the ZM-BTS interface managers in each zone manager.

In FIG. 6, the ZM-BSC interface manager 147 interfaces the zone manager 13 to the BSC 16 of FIG. 1 for coordination of burst scheduling and assignment functions. The burst scheduling and assignment for fast macrodiversity switching can be performed in the BSC 16 with input from the zone managers 13, can be performed in the zone managers 13 with input from the BSC 16 or can be shared between zone managers 13 and BSC 16.

The fast macrodiversity switching typically operates in an environment having features such as power control, frequency hopping, smart antennas and repeaters. In such environments, the additional benefit provided by fast macrodiversity switching results because each dedicated channel tends to operate using a radio link with the lowest available path loss for that dedicated channel. The fast macrodiversity switching makes it possible to reduce the MS and the BTS transmitter power levels. When implemented in an entire network, the lower power levels lead to a reduction in interference levels. Further, these reductions allow network operators to change the frequency reuse patterns and increase network capacity and/or throughput.

The zone manager 13 includes in combination a number of modules. The modules include a switching processing means 131 that provides signal information for identifying candidate ones of the transceiver stations to service dedicated channels for mobile stations. The modules include switching control means 132 that dynamically switches among candidate ones of the transceiver stations to provide the dedicated channels for the mobile stations where the switching has the potential for causing ones of the bursts to have time shifts. The modules include a macro-diversity (MD) timing control means 133 for controlling the timing of bursts to provide time adjustments that compensate for the time shifts and reduce overlap of bursts. The modules include a scheduling means 134 that schedules bursts in time slots. The modules include an allocation means 135 for assigning bursts to time slots. The modules include a measurement means 136 for measuring signal timing. Further details relating to various of the foregoing modules are described in the above-identified cross-referenced applications. The modules include a collision prediction means 137 predicting collisions as a result of frequency hopping. The modules include a hopping extraction means 138 for extracting frequency hopping information from the BSC.

The switching processing means 131, switching control means 132, the MD timing control means 133, the scheduling means 134 and the allocation means 135, measurement means 136, collision prediction means 137, and hopping extraction means 138 are each means that form part of the zone manager 13 and that are implemented by computer code modules that execute functions in processor 20 relying on the other elements of the zone manager 13 and information stored in the data base 25. The information stored in the data base 25 for each MS includes Uplink Fast Timing Offset (UFTO), Downlink Fast Timing Offset (DFTO), Uplink Fast Timing Adjustment (UFTA), resource group information (for assisting scheduling and reassignment of bursts ), degree of overlap of bursts for candidate base stations, different frequencies used for bursts and adjacent bursts (to enable assemble of overlapped tail bits), hopping sequences, MAIO, MSs, frame numbers, and similar information.

The ZM-to-BTS link 15 is used to transport voice or data traffic, connection setup information, control information (for MDP, RM, and AC functions) and fast macrodiversity switching traffic forwarded to other ZMs and BTSs. The control of this data flow in both directions is formatted and organized by the ZM-BTS interface managers in each zone manager.

When frequency hopping FH is used in the network, home radio resources change the radio frequency used for bursts in accordance with a specific hopping sequence FHS and offset MAIO. According to the GSM specifications, this operation is implemented during connection setup by sending a channel activation message from the BSC to the home radio resource that includes hopping sequence information consisting of a hopping sequence (HS) number and a MAIO assignment for the radio resource on the particular time slot. Based on this HS information, the radio resource determines its FH sequence. This same channel activation messages are used by the BSS when FMS is enabled in the network.

According to embodiments of the invention, there is a difference in the way the channel activation message is transmitted to the radio resources depending on the type of radio resource. For home radio resources, the channel activation message is sent from the BSC to the home radio resource directly. No intervention by the ZM other than extraction of the HS information from the channel activation message and storage in the database is needed. However for guest radio resources in any of the BTSs, a different activation process is used. Guest radio resources in any particular BTS are shared by other BTSs, that temporarily use the particular BTS as an assistant BTS and temporarily use the guest radio resource in the $_a$BTS instead of a home radio resource in the $_h$BTS. Therefore, the guest radio resource hopping sequence $_g$HS in an $_a$BTS is the same as the home radio resource hopping sequence $_h$HS used in the $_h$BTS for any particular MS. The $_h$HS information has been stored in the $_h$ZM requesting the use of the guest radio resource during connection set-up. It is transmitted by the $_h$ZM to the $_a$ZM where the guest radio resource is located via the ZM to ZM link during a request for the use of the guest radio resource. The $_a$ZM receiving the request stores the $_h$HS information in its data base as a $_g$HS and sends it to the guest radio resource in a channel activation message upon activating the resource.

Therefore, according to the embodiments of the invention, it is a capability of $_h$ZMs to intercept channel activation messages during connection set-up and during handovers. It is another capability of $_h$ZMs to extract from these channel activation messages, $_h$HS information for all active home radio resources located in the $_h$BTS. It is yet another capability of $_h$ZMs to transmit, over the ZM to ZM links, $_h$HS information for guest radio resources to $_a$BTSs via $_a$ZMs. It is a capability of $_a$ZMs to store in their databases, $_h$HS information from other BTSs as $_g$HS information.

In an alternate embodiment, $_h$ZMs broadcast all $_h$HS in use to all $_a$ZM instead transmitting the $_h$HS only to an $_a$ZM during a guest radio resource request. These ZM capabilities enable networks to operate both with FH and FMS.

In order to avoid collisions in a frequency hopping network with FMS, ZMs predict radio channel interference that can result, for example, from cochannel burst collisions or adjacent channel overlap. In FIG. 6, this prediction is performed in a collision prediction module 137 located in the ZM 13. The collision prediction modules in the $_h$ZMs calculate burst frequencies for home and guest radio resources ahead of time based on $_h$HS and $_g$HS information, respectively, stored in the $_h$ZM data bases 25 of FIG. 6.

A collision prediction module 137 calculates burst frequencies for all time slots and all active radio resources over a prediction period. The prediction period is equal to a number of frames and ranges from a minimum of one frame to a system fixed or user defined number of frames. The calculations are typically updated at the frame rate such that at every frame, a new set of burst frequencies is calculated.

During each burst by burst step of these calculations, the collision prediction modules compare the burst frequencies to be used at the prediction period by guest radio resources with burst frequencies to be used at the prediction period by all home radio resources.

An example for frequency prediction is given in FIG. 7. FIG. 7 shows a table with frequency hopping sequences for two different hopping sequences HS1 and HS2, each using the same pool of eight radio frequencies. The number of radio frequencies in the hopping pool is a matter of design choice and can be any value (for example, other values such as 4, 21 or 33 frequencies can be employed). In FIG. 7, detailed data is shown for Slot Number 0 for each of eight successive frames, Frame Number 1, Frame Number 2, . . . . Frame Number 8. One of the hopping sequences, for example HS1, is assigned to a first $_1$BTS, and the second hopping sequence HS2 is assigned to a second $_2$BTS. The radio resources in $_1$BTS are assigned one of the MAIOs shown in the MAIO column in FIG. 7. There are eight MAIOs for both BTSs. Assume that one of the radio resources in one of the sectors of $_1$BTS uses MAIO 1 to serve a mobile $MS_1$, as shown in diagonal hatching. Assume further that a second mobile $MS_2$ is served by $_1$BTS in the same sector as $MS_1$ using MAIO 3, as shown by vertical hatching.

In addition to $MS_1$ and $MS_2$, there are other mobiles such as $MS_3$ and $MS_4$ active in the network being served by $_2$BTS using the same eight frequencies with HS2 and one of the MAIOs for HS2 shown in FIG. 7. When FMS is enabled in the network and when any particular one of these other mobiles using HS2 encounters a shadow fade in such a way that its path loss to $_1$BTS becomes lower than the path loss to its home base station, $_2$BTS, its zone manager considers switching the dedicated channels to $_1$BTS assigning a guest radio resource to use the same hopping sequence from HS2 that was used in $_2$BTS for the particular mobile. As can be seen from FIG. 7, the bursts from the particular mobile may or may not have collisions with bursts from MS, and $MS_2$ when served by $_1$BTS. In FIG. 7, boxes for HS2 with diagonal shading of bursts indicate predicted collisions with a $_1$MS using MAIO1 in HS1. For example, if the particular mobile uses MAIOs 1, 2, or 3 of HS2, it has no predicted collisions with $MS_1$, if the particular mobile uses MAIOs 5, 6, or 8 of HS2, it has one predicted collision per HS cycle with $MS_1$, if the particular mobile uses MAIO 4 of HS2 it has two predicted collisions per HS cycle, and if the particular mobile uses MAIO 7 of HS2 it has three predicted collisions per HS cycle. The predicted collisions in MAIOs 5, 6, and 8 of HS2 for Time Slot Number 0 are in Frame Numbers 1, 3 and 2, respectively. The predicted collisions in MAIO 4 of HS2 are in Frame Numbers 4 and 7. The predicted collisions in MAIO 7 of HS2 are in Frame Numbers 5, 6 and 8.

Likewise, the particular mobile may or may not have collisions with $MS_2$ served by a home radio resource in $_1$BTS using MAIO3. In FIG. 7, boxes for HS2 with vertical shading indicate collisions with $MS_2$ which uses MAIO3 in HS1. As shown in FIG. 7, if a particular mobile is switched to $_1$BTS, the guest radio resource in $_1$BTS is tuned to HS2 and the MAIO used for the particular mobile in HS2. If the particular mobile uses MAIOs 3, 4, or 5 of HS2, it has no predicted collisions; if it uses MAIOs 2, 7 or 8 of HS2, it has one predicted collision; if it uses MAIO 6 of HS2, it has two predicted collisions; and if it uses MAIO 1 of HS2, it has three predicted collisions per HS cycle, respectively. The predicted collisions in MAIOs 2, 7 and 8 of HS2 are in Frame Numbers 8, 7 and 1, respectively. The predicted collisions in MAIO 6 of HS2 are in Frame Numbers 2 and 5. The predicted collisions in MAIO 1 of HS2 are in Frame Numbers 3, 4 and 6.

In operation, the data of FIG. 7 is known. For example, the data in one embodiment is continuously detected by the hopping extraction means 138 of FIG. 6 which functions to monitor the channel activation messages of the BSC with communications that are under control of the ZM-BSC interface manager 147 of FIG. 6. A prediction of a collision is made by collision prediction means 137 of FIG. 6 which operates to consult the HS2 data of FIG. 7 for any particular mobile using a MAIO of HS2 being served by $_2$BTS. If such a mobile using a MAIO of HS2 and being served by a $_2$BTS is to be switched under control of FMS to $_1$BTS, then the diagonally and vertically shaded boxes of HS2 in FIG. 7 are predicted collisions with the mobiles $MS_1$ and $MS_2$, respectively, already being served by $_1$BTS. The prediction is made by making a frame by frame comparison of the hopping sequence burst frequencies of a candidate MS with all the burst frequencies of active MSs being served by the BTS to which the candidate MS is to be switched.

For example, if $MS_3$ is the candidate MS being served by $_2$BTS which is a candidate to be switched to $_1$BTS, then the comparison is as follows. In FIG. 7, for Time Slot Number 0 in Frame Number 1, the burst frequence 7 of $MS_3$ is compared with burst frequency 5 of $MS_2$ and the burst frequency 1 of $MS_1$ and the results of both comparisons are unequal indicating no collisions.

In Time Slot Number 0 of Frame Number 2, the burst frequency 4 of $MS_3$ is compared with the burst frequency 4 of $MS_2$ and with the burst frequency 6 of MS, resulting in an equal compare for $MS_3$ and $MS_2$ and an unequal compare for $MS_3$ and $MS_1$. The equal comparison for $MS_3$ and $MS_2$ constitutes a collision prediction. The burst frequency by burst frequency comparison for Time Slot Number 0 continues for all eight frames (Frame Number 1, Frame Number 2, . . . . Frame Number 8) and the result of the comparison in each frame is stored in the data base 25 of FIG. 6 of the zone manager making the switching decisions. In the present example, $_1$BTS is assumed to be the home BTS for $MS_1$, $MS_2$, and $MS_3$. Accordingly, the FIG. 7 data and comparison results are stored in the FIG. 6 zone manager 13 corresponding to $_1$BTS. Since any particular BTS can be a home BTS for some MSs and an assistant BTS for other MSs, the FIG. 7 data is shared among zone managers under control of ZM-ZM interface managers 23 as needed.

The comparisons of FIG. 7 are determined and stored not only for Time Slot Number 0 but also in a similar manner for each of the other time slots across all frames. After the data and comparisons of FIG. 7 are determined and stored for all of the frames (Frame Number 1, Frame Number 2, . . . . Frame Number 8) shown in FIG. 7, the process repeats for subsequent frames such as Frame Number 9, Frame Number 10, . . . . Frame Number P, where P is any integer number. The number of frames in advance of the current next frame (Frame Number 1 in the example of FIG. 7) for which predictions are calculated is a tunable parameter that is fixed in some embodiments and user definable in other embodiments. For one example, predictions are made four frames in advance so in such an example in FIG. 7, the predictions are first made for Frame Number 1, Frame Number 2, Frame Number 3 and Frame Number 4. Then after Frame Number 1 completes Frame 2 becomes the next current frame, the predictions are made for Frame Number 2, Frame Number 3, Frame Number 4 and Frame Number 5.

When a collision is predicted between a guest radio resource and a home radio resource for a particular burst, the assistant zone manager, $_a$ZM, and the home zone manager, $_h$ZM, exchange collision signaling information so that FMS switching is modified to avoid the predicted collision. The collision signaling information includes the Frame Number or frame time of the frame that will have the predicted collision. This prediction information allows the $_h$ZM to determine how to avoid the collision based upon the predicted time when the collision will occur. In response to the collision prediction information, the $_h$ZM schedules switching of the dedicated channels to an alternate radio resource. This switching may be effected for a single burst only or for a sequence of bursts.

In an embodiment of the invention where all ZMs are co-located, one or more of the functions performed by $_h$ZM and $_a$ZM can be combined. For example, a common data base may be used by all such ZMs. Likewise, the resource management for all radio resources may be performed by a single resource manager and the collision prediction calculations maybe combined in one processor for all calls controlled by the centralized ZM.

In FIG. 8, examples of switching using FMS and FH prediction are represented. In connection with FIG. 8, it is assumed that a $_1$BTS is the home base station using HS1 with MAIO1 for MS$_1$ and MAIO3 for MS$_2$ as described in connection with FIG. 7. In connection with FIG. 8, it is assumed that a $_2$BTS is a home base station using HS2 with MAIO6 for MS$_3$ and MAIO3 for MS$_4$ as described in connection with FIG. 7. Under the assumed conditions of operation of FIG. 8, there is no request to switch the dedicated channels of MS$_1$ and MS$_2$ to an alternate BTS and hence the FMS-$_2$BTS rows are empty.

Under the assumed conditions of operation of FIG. 8, there is a request to switch the dedicated channels of candidate MS$_3$ from $_2$BTS to $_1$BTS and hence the FMS-$_1$BTS row is populated to indicate that a request to switch is pending. However, the requested switch of MS$_3$ from $_2$BTS to $_1$BTS has the predicted collisions (co-channel interference) with MS$_1$ in Frame Number 3 and predicted collisions with MS$_2$ in Frame Number 2 and Frame Number 5. Accordingly, based on the prediction information, the switch of MS$_3$ from $_2$BTS to $_1$BTS, under combined FH prediction and FMS, switches MS$_3$ from $_2$BTS to $_1$BTS in Frame Numbers 1, 4, 6, 7 and 8 as shown by the FH/FMS-$_1$BTS row of FIG. 8. However, based on the prediction information, the switch of MS$_3$ from $_2$BTS to $_1$BTS, under combined FH prediction and FMS, does not switch MS$_3$ from $_2$BTS to $_1$BTS but leaves MS$_3$ served by $_2$BTS in Frame Numbers 2, 3 and 5 as shown by the FH/FMS-$_2$BTS row of FIG. 8. Alternatively, and not shown in FIG. 8, bursts in Frame Numbers 2, 3 and 5 can be switched, for Time Slot Number 0, to one or more other assistant BTSs if such BTSs are available and suitable.

Under the assumed conditions of operation of FIG. 8, there is a request to switch the dedicated channels of MS$_4$ from $_2$BTS to $_1$BTS and hence the FMS-$_1$BTS row is populated to indicate that a request to switch is pending. The requested switch of MS$_4$ from $_2$BTS to $_1$BTS has no predicted collisions (co-channel interference) with MS$_1$ or MS$_2$. However, the switch of MS$_4$ from $_2$BTS to $_1$BTS does have the possibility of adjacent channel interference with MS$_1$ in Frame Number 1. Accordingly, based on the predicted adjacent channel interference, the switch of MS$_4$ from $_2$BTS to $_1$BTS, under combined FH prediction and FMS, switches MS$_4$ from $_2$BTS to $_1$BTS in Frame Numbers 2, 3, 4, 5, 6, 7 and 8 as shown by the FH/FMS-$_1$BTS row of FIG. 8. However, based on the adjacent channel interference prediction, the switch of MS$_4$ from $_2$BTS to $_1$BTS, under combined FH prediction and FMS, does not switch MS$_4$ from $_2$BTS to $_1$BTS but leaves MS$_4$ served by $_2$BTS in Frame Number 1 as shown by the FH/FMS-$_2$BTS row of FIG. 8.

While the invention has been particularly shown and described with reference to preferred embodiments thereof it will be understood by those skilled in the art that various changes in form and details may be made therein without departing from the scope of the invention.

What is claimed is:

1. A communication system for communication using wireless signals including downlink signals to and uplink signals from mobile stations, comprising,
   hopping control means for indicating frequency hopping sequences for said downlink signals and said uplink signals,
   a plurality of transceiver stations having broadcast channels and dedicated channels carried by said wireless signals,
   zone manager means including,
      hopping extraction means for extracting frequency hopping information from said hopping control means,
      collision prediction means forming predictions of radio channel interference between dedicated channels,
      switching control means responsive to said predictions for dynamic switching of said dedicated channels so as to avoid said interference;
   wherein said collision prediction means tracks hopping frequencies for multiple mobile stations for a prediction period.

2. The communication system of claim 1 wherein said zone manager means includes a data base for storing said frequency hopping information for said downlink signals and uplink signals for mobile stations.

3. The communication system of claim 1, wherein said zone manager means includes multiple discrete zone managers, each zone manager including a zone manager to zone manager (ZM-ZM) interface manager for transmitting frequency hopping information between said multiple discrete zone managers.

4. The communication system of claim 1 wherein said prediction period is fixed as one or more frames.

5. The communication system of claim 1 wherein said prediction period is user defined.

6. The communication system of claim 1, wherein said collision prediction means compares the hopping frequencies of radio resources for said multiple mobile stations to predict collision occurrences among said multiple mobile stations.

7. The communication system of claim 1 wherein said zone manager means includes multiple discrete zone managers, each zone manager including a zone manager to zone manager (ZM-ZM) interface manager for transmitting frequency hopping information among said zone managers, wherein said collision prediction means for one of said multiple discrete zone managers compares the hopping frequencies of radio resources for said multiple mobile stations to predict collision occurrences among said mobile stations and wherein said collision prediction means communicates predicted collision occurrences to other of said multiple discrete zone managers.

8. The communication system of claim 7 wherein said communication of said predicted collision occurrences causes said switching means to control switching of one or more bursts to avoid said predicted collision occurrences.

9. The communication system of claim 1 wherein said collision prediction means tracks hopping frequencies for multiple mobile stations and said radio channel interference is cochannel interference.

10. The communication system of claim 1 wherein said collision prediction means tracks hopping frequencies for multiple mobile stations and said radio channel interference is adjacent channel interference.

11. A communication system for communication using wireless signals including downlink signals to and uplink signals from mobile stations, comprising,
   hopping control means for indicating frequency hopping sequences for said downlink signals and said uplink signals,
   a plurality of transceiver stations having broadcast channels and dedicated channels carried by said wireless signals, zone manager means including,
  hopping extraction means for extracting frequency hopping information from said hopping control means,
  collision prediction means forming predictions of radio channel interference between dedicated channels,
  switching control means responsive to said predictions for dynamic switching of said dedicated channels so as to avoid said interference;
wherein,
said plurality of transceiver stations include a home transceiver station and one or more assistant transceiver stations,
said zone manager means includes multiple discrete zone managers including a home zone manager for said home transceiver station for controlling the dedicated channels for particular mobile stations and one or more assistant zone managers for said assistant transceiver stations for controlling dedicated channels for ones of said particular mobile stations switched to said one or more assistant transceiver stations,
said collision prediction means for said home zone manager compares the hopping frequencies of radio resources for said particular mobile stations to predict radio channel interference between dedicated channels for said particular mobile stations and other mobile stations.

12. A communication system for communication using wireless signals including downlink signals to and uplink signals from mobile stations, comprising,
  hopping control means for indicating frequency hopping sequences for said downlink signals and said uplink signals,
  a plurality of transceiver stations having broadcast channels and dedicated channels carried by said wireless signals,
  zone manager means including,
    hopping extraction means for extracting frequency hopping information from said hopping control means,
    collision prediction means forming predictions of radio channel interference between dedicated channels,
    switching control means responsive to said predictions for dynamic switching of said dedicated channels so as to avoid said interference;
  wherein,
  said plurality of transceiver stations includes first and second home transceiver stations and one or more assistant transceiver stations,
  said zone manager means includes multiple discrete zone managers including first and second home zone managers for said first and second home transceiver stations for controlling the dedicated channels for first particular mobile stations and for second particular mobile stations, respectively, and one or more assistant zone managers for said one or more assistant transceiver stations, respectively, for controlling dedicated channels for ones of said first particular mobile stations and ones of said second particular mobile stations switched to one or more of said assistant transceiver stations,
  said collision prediction means for said first home zone manager compares the hopping frequencies of radio resources for said first particular mobile stations and for said second particular mobile stations to predict radio channel interference among dedicated channels for said first particular mobile stations and for said second particular mobile stations.

13. The communication system of claim 12 wherein each of said zone managers includes a data base for storing said frequency hopping information for said downlink signals and uplink signals for mobile stations.

14. The communication system of claim 12 wherein each of said zone managers includes a zone manager to zone manager (ZM-ZM) interface manager for transmitting frequency hopping information among said zone managers.

15. The communication system of claim 12 wherein said collision prediction means for each home zone manager tracks hopping frequencies for multiple mobile stations for a prediction period.

16. The communication system of claim 15 wherein said prediction period is fixed as one or more frames.

17. The communication system of claim 15 wherein said prediction period is user defined.

18. The communication system of claim 15 wherein said collision prediction means for each of said home zone managers compares the hopping frequencies of radio resources for said multiple mobile stations to predict collision occurrences among said multiple mobile stations.

19. The communication system of claim 18 wherein said communication of said predicted collision occurrences causes said switching means to control switching of one or more bursts to avoid said predicted collision occurrences.

20. The communication system of claim 12 wherein said collision prediction means for each of said home zone managers tracks hopping frequencies for multiple mobile stations and said radio channel interference is cochannel interference.

21. The communication system of claim 12 wherein said collision prediction means for each of said home zone managers tracks hopping frequencies for multiple mobile stations and said radio channel interference is adjacent channel interference.

22. A communication system for communication using wireless signals including downlink signals to and uplink signals from mobile stations, comprising,
  hopping control means for indicating frequency hopping sequences for said downlink signals and said uplink signals,
  a plurality of transceiver stations having broadcast channels and dedicated channels carried by said wireless signals,
  zone manager means including,
    hopping extraction means for extracting frequency hopping information from said hopping control means,
    collision prediction means forming predictions of radio channel interference between dedicated channels,
  switching control means responsive to said predictions for dynamic switching of said dedicated channels so as to avoid said interference;
  wherein a particular mobile station, $MS_i$ communicates on a traffic channel, $TCH_i$, with a transceiver station, $BTS_i$, using hopping sequence, $FHS_i$, and an offset, $MAIO_i$, and wherein another particular mobile station, $MS_j$, communicates on traffic channel, $TCH_j$, with a transceiver station, $BTS_j$, using hopping sequence, $FHS_j$, and offset, $MAIO_j$ and wherein said collision prediction means forms predictions of radio channel interference between traffic channel, $TCH_i$, and traffic channel, $TCH_j$, when traffic channel, $TCH_j$ is a candidate to switch to transceiver station, $BTS_i$, and wherein said switching control means is responsive to said predictions for dynamic switching of said and traffic channel, $TCH_j$, so as to avoid said interference.

* * * * *